US011490290B2

(12) United States Patent
Dakshinkar et al.

(10) Patent No.: US 11,490,290 B2
(45) Date of Patent: Nov. 1, 2022

(54) PROTECTING 802.11 AX NETWORKS FROM QOS NULL ATTACKS

(71) Applicant: Hewlett Packard Enterprise Development LP, Houston, TX (US)

(72) Inventors: Abhiruchi Dakshinkar, Santa Clara, CA (US); Shubham Saloni, Santa Clara, CA (US); Gaurav Patwardhan, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 123 days.

(21) Appl. No.: 17/032,926

(22) Filed: Sep. 25, 2020

(65) Prior Publication Data

US 2022/0104074 A1 Mar. 31, 2022

(51) Int. Cl.
| | |
|---|---|
| *H04W 28/24* | (2009.01) |
| *H04W 52/02* | (2009.01) |
| *H04W 84/12* | (2009.01) |
| *H04W 72/04* | (2009.01) |
| *H04L 5/00* | (2006.01) |

(52) U.S. Cl.
CPC ........... *H04W 28/24* (2013.01); *H04L 5/0007* (2013.01); *H04W 52/0216* (2013.01); *H04W 72/0413* (2013.01); *H04W 84/12* (2013.01)

(58) Field of Classification Search
CPC ............. H04W 28/24; H04W 52/0216; H04W 72/0413; H04W 84/12; H04L 5/0007
See application file for complete search history.

(56) References Cited

U.S. PATENT DOCUMENTS

| 7,342,929 | B2 * | 3/2008 | Bremler-Barr | .......... | H04L 47/56 |
| | | | | | 370/412 |
| 11,212,681 | B1 * | 12/2021 | Balaramn | ........... | H04W 12/122 |
| 2017/0026151 | A1 * | 1/2017 | Adachi | ............... | H04W 72/005 |

FOREIGN PATENT DOCUMENTS

| GB | 2585229 A | * | 1/2021 | ............... | H04L 1/08 |
| WO | WO-02063798 A1 | * | 8/2002 | ........... | H04B 7/2123 |

* cited by examiner

*Primary Examiner* — Mohammad S Anwar
(74) *Attorney, Agent, or Firm* — Hewlett Packard Enterprise Patent Department

(57) ABSTRACT

A method for protecting 802.11 ax networks includes receiving, by an access point, a plurality of Single User (SU) Quality of Service (QOS) NULL frames from a station, tracking, by the access point as the plurality of SU QOS NULL frames are received, a variable in one or more of the plurality of SU QOS NULL frames, determining, by the access point and based on tracking the variable, the station is suspicious, sending, by the access point and in response to determining the station is suspicious, a request to check a status of the variable, determining, by the access point and based on a response to the request, the station is under attack, and flagging, by the access point, the station as under an attack.

20 Claims, 5 Drawing Sheets

| Pending data status at STA | STA support for UL-OFDMA? | Attacker advertises UL-OFDMA support on behalf of the STA? | Impact |
|---|---|---|---|
| STA has data to transmit on the UL | Yes | No | STA will miss opportunity for UL-OFDMA when scheduled by the AP. |
| | No | Yes | Denial of service for other clients in the BSS as RUs assigned to the STA under attack are wasted. BSS throughput is reduced. |
| No UL data available at the STA | Yes | No | No impact |
| | No | Yes | Denial of service for other clients in the BSS as RUs assigned to the STA under attack are wasted. BSS throughput is reduced. |

PROTECTING 802.11 AX NETWORKS FROM QOS NULL ATTACKS

DESCRIPTION OF RELATED ART

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The Institute of Electrical and Electronics Engineers (IEEE) publish many popular specifications for use in wireless under the 802.11 standard family. 802.11 continues to evolve in an attempt to address all challenges presented with the proliferation of wireless devices.

One of these challenges is ensuring that the network is secure and robust against attacks. There are many different kinds of attacks that can be mounted against a wireless network, from one or more attacking devices working alone or in conjunction. Improved strategies for detecting and mitigating attacks are always needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 depicts an example of protecting networks from QOS Null attacks in accordance with one or more embodiments.

The figures are not exhaustive and do not limit the present disclosure to the precise form disclosed.

DETAILED DESCRIPTION

In 802.1 lax, many different types of frames may be sent. One often overlooked type is a Null frame. Generally, Null frames are sent for Quality of Service (QoS) reasons, such as indicating various power saving modes or active/passive scanning, although QoS Null frames may be sent for other reasons as well. Specifically, a QoS Null frame is a Physical Layer Protocol Data Unit (PPDU) with no data. However, the QoS Null frame still contains a QoS control field and an optional High Throughput (HT) control field. In the absence of data, the frame cannot be encrypted. Thus, the contents of the header may be used by a spoofer to disrupt the network. In particular, the disruption could take the form of a Denial of Service (DOS) attack.

This attack is easy to initiate as the spoofer does not even need to be a High Efficiency (HE) station. The spoofer could generate and send Single User (SU) QoS Null frames as part of the DoS attack. A SU QoS Null frame is easy for any Wi-Fi capable device to send, as all that is needed are the relevant Medium Access Control (MAC) addresses. The MAC addresses can easily be found by sniffing the channel.

Realizing this, the inventors have invented a way to detect a QoS Null Frame DOS attack and have also invented various ways to mitigate the attack once detected. These improvements may be utilized at the access point or at any other suitable location within the network.

Figure 1:
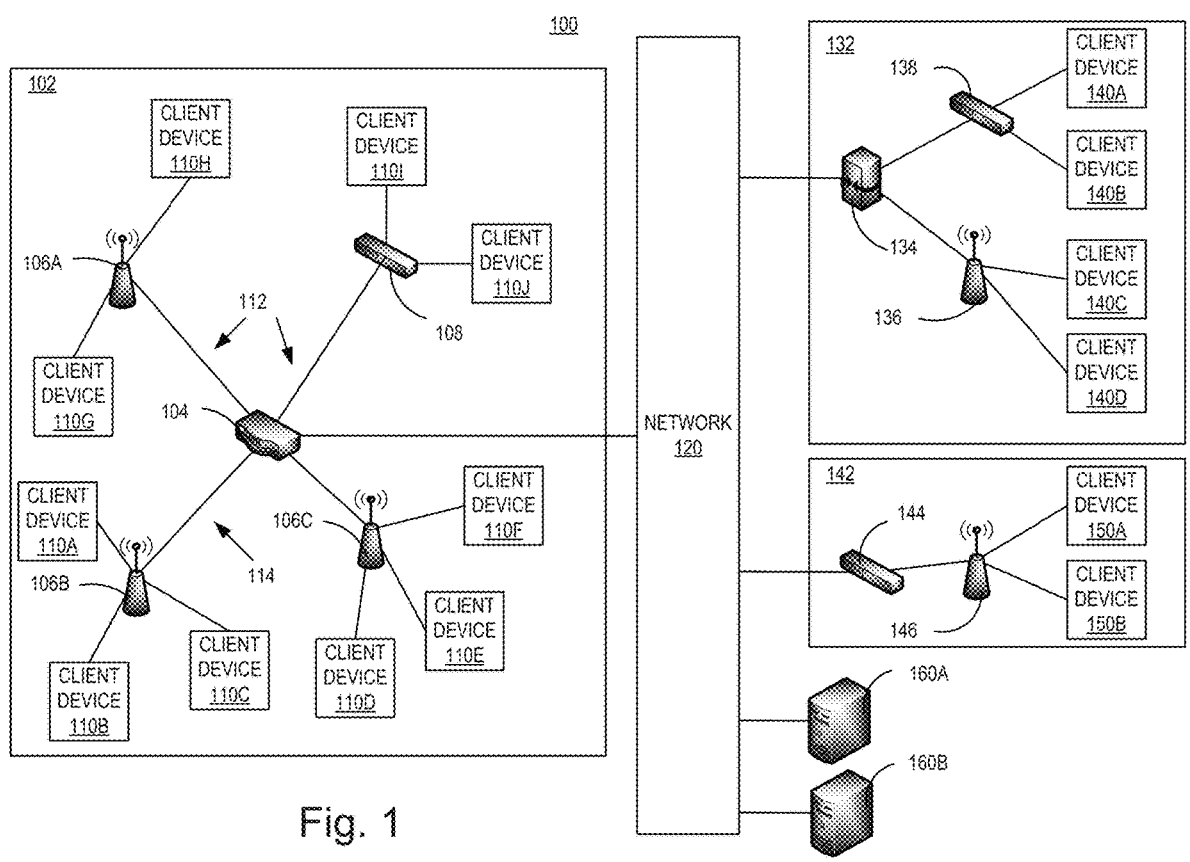
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110$i$-$j$. Client devices 110$i$-$j$ may connect to the switch 108 and through the switch 108, may be able to access other devices within the network configuration 100. The client devices 110$i$-$j$ may also be able to access the network 120, through the switch 108. The client devices 110-$j$ may communicate with the switch 108 over a wired 112 connection. In the illustrated example, the switch 108 communicates with the controller 104 over a wired 112 connection, though this connection may also be wireless.

Wireless APs 106$a$-$c$ are included as another example of a point of access to the network established in primary site 102 for client devices 110$a$-$h$. Each of APs 106$a$-$c$ may be a combination of hardware, software, and/or firmware that is configured to provide wireless network connectivity to wireless client devices 110$a$-$h$. In the illustrated example, APs 106$a$-$c$ can be managed and configured by the controller 104. APs 106$a$-$c$ communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140$a$-$d$.

In various embodiments, the remote site 132 may be in direct communication with primary site 102, such that client devices 140$a$-$d$ at the remote site 132 access the network resources at the primary site 102 as if these clients devices 140$a$-$d$ were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150$a$-$b$ access the network 120. Such a remote site 142 may represent, for example, an individual employee's home or a temporary remote office. The remote site 142 may also be in communication with the primary site 102, such that the client devices 150$a$-$b$ at remote site 142 access network resources at the primary site 102 as if these client devices 150$a$-$b$ were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160$a$-$b$. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160$a$-$b$. Content servers 160$a$-$b$ may include various providers of multimedia downloadable and/or streaming content, including audio, video, graphical, and/or text content, or any combination thereof. Examples of content servers 160$a$-$b$ include, for example, web servers, streaming radio and video providers, and cable and satellite television providers. The client devices 110$a$ j, 140$a$-$d$, 150$a$-$b$ may request and access the multimedia content provided by the content servers 160$a$-$b$.

The inventors have anticipated two different attack scenarios, although other attack scenarios are possible and are also within the scope of the invention described herein. The first attack scenario relates to an incorrect queue depth indication, which results in an unfair resource allocation. In this attack scenario, the queue size sub field in the QoS control sub-field in the MAC header could be manipulated to show a high or low value. The extent of the damage done by the spoofer is a function of the delta between the actual queue size and the manipulated queue size advertised by the attacker. If the queue size was manipulated to be lower than the actual queue size, service would be denied to the HE station under attack. If the queue size was manipulated to be higher than the actual queue size, then unfairness will be introduced and can lead to DOS to other peers connected to the Basic Service Set (BSS).

The second attack scenario identified by the inventors is tampering with the Uplink (UL) Orthogonal Frequency Division Multiple Access (OFDMA) information in the HE variant of the H T control field. This would result in denial of Multi-user (MU) transmission opportunities. Specifically, the control information subfield in an Operating Mode (OM) control subfield contains information related to the OM change of the station transmitting the frame containing the information. "UL MU Disable" (B5) and "UL MU Data Disable" (BI 1) bits of the OM control subfield indicate the operational state of MU transmissions. By manipulating these two bits the attacker can deny the advantages of MU transmissions in a network.

Other attack scenarios envisioned by the inventors include exploiting other fields in the HT control, such as the channel width, Receive (RX) Number of Spatial Streams (NSS), Transmit (TX) Number of Space Time Streams (NSTS), etc. Although the detection may be slightly different, the mitigation strategies described below may still be used. Likewise, the same manipulation can be done using QOS Null frames sent in response to Buffer Status Report Poll (BSRP) trigger frame. However, that would require a HE spoofer. A HE spoofer is capable of many different types of attacks within a network.

Figure 2:
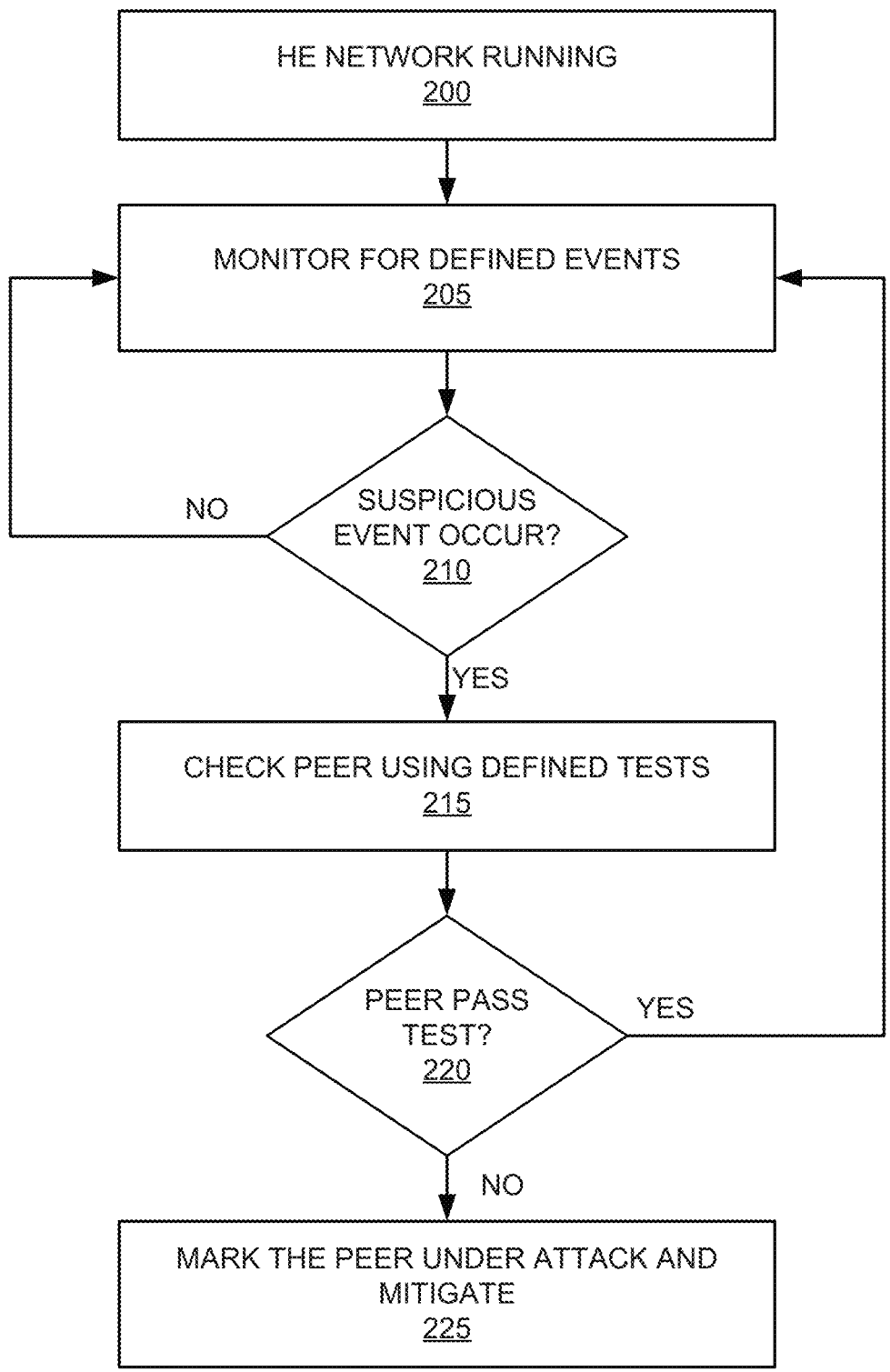
FIG. 2 depicts a flowchart of a method for protecting networks from QOS Null attacks in accordance with one or more embodiments.

FIG. 2 depicts a flowchart of a method for protecting networks from QOS Null attacks in accordance with one or more embodiments. Although the steps in FIG. 2 are shown in an order, it is not the only order for the steps. The steps may be performed at any time, in any order. Additionally, the steps may be repeated or omitted as needed.

Additionally, the steps may be performed by any suitable device, such as an access point, controller, switch, computing device, network infrastructure device, etc. The suitable device may include a hardware processor (not shown), such as one or more central processing units (CPUs), semiconductor-based microprocessors, and/or other hardware devices suitable for retrieval and execution of instructions stored in a machine-readable storage medium (not shown). The hardware processor may fetch, decode, and execute instructions, to control processes or operations for protecting networks from QOS Null attacks in accordance with one or more embodiments. As an alternative or in addition to retrieving and executing instructions, hardware processor may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium, may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some embodiments, a machine-readable storage medium may be a non-transitory storage medium, where the term "non-transitory" does not encompass transitory propagating signals.

At a high level, the flowchart of FIG. 2 provides a broad framework for detecting and mitigation QOS Null Frame DOS attacks. Turning to the specifics of FIG. 2, in step 200 a HE network is established and running. The network may be up and running for any amount of time, may be in any configuration or setup, and may contain any number of same or different network devices. The network may be a network such as described in FIG. 1.

In step 205, defined events are monitored for. The events may be defined at any time, by any suitable entity, and may change dynamically. For example, the events may relate to a QOS Null Frame DOS attack, as described herein. Any number of different events may be monitored for.

In step 210, a determination is made whether any suspicious events occurred. The suspicious events may be any event and may correspond or relate to any type or types of attack. The suspicious events, by themselves, do not necessarily mean that a particular station or peer is malicious. However, the suspicious events are a useful indicator that additional scrutiny should be performed. The suspicious events may be monitored for constantly, on a periodic basis, or in any other manner. If no suspicious events occurred, the method returns to step 205. If there are suspicious events, then the method proceeds to step 215.

In step 215, the suspicious peer is checked using defined tests. The defined tests may be defined at any time, by any suitable entity. In particular, many different tests may be defined and/or administered, depending on the particular suspicious events in question.

In step 220, a determination is made whether the peer passed the test. The determination may be made in any suitable manner by any suitable entity. The determination may be based on one test or on multiple tests. If the peer passed the test the method returns to step 205. If the peer did not pass the test, the method proceeds to step 225.

In step 225, the peer is marked as under attack and mitigation steps are taken. The peer may be marked as under attack in any suitable manner. Any type or amount of mitigation steps may be taken.

The framework of FIG. 2 will now be used to explain how the first type of attack, an incorrect queue size attack, may be detected and mitigated. As previously mentioned, an incorrect queue depth can result in unfair resource allocation. Fortunately, an access point has multiple ways to determine the queue size. A queue size contained in a QOS Null frame received in response to a trigger BSRP will be considered valid, as will an encrypted QOS data frame (SU or MU). The following method may be performed for each Traffic Identifier (TID) if the station does not support HE variant of HT control field. If the station does support HE variant of HT control field, then the method may be used on each access category.

$q1$ is the queue size received in SU QOS Null frame from client for specific TID. $q2$ is the queue size received in the next valid QOS frame from the client after the SU QOS Null frame from the client with the same TID. $s$ is the suspicion count. Assume that $q1=0$, $q2=0$, and $s=0$. Store the queue size received in SU QOS Null frame from the client ($q1$). Start timer t for 5 seconds (although any suitable amount of time may be used). Store the queue size received in the next valid QOS frame from the client ($q2$).

If $(((q1>q2)$ && $(q1-q2>delta))$ or $((q1<q2)$ && $(q2-q1>delta)))$ then the transaction is suspicious and the count (s) is increased. $q1$ and $q2$ are reset to 0.

If ($s$=Max_suspicious_count) then peer suspected to be under attack. $s$ is reset to 0, and the timer t is reset.

This simple check is sufficient to consider a peer suspicious because a spoofer would want to advertise a queue size vastly different from the actual queue size. The value of delta could be a randomly high value or could be intelligently calculated as a function of access category, type of the client device, profiling the traffic patterns, etc.

Once the client/peer is determined to be suspicious, then the suspicion needs to be confirmed via testing. Thus, once an access point is suspicious about a specific client, the access point will solicit the queue size from the client using Trigger BSRP frame after receiving a SU QOS Null frame from that client. If the queue sizes reported in response to the BSRP trigger are vastly different from those received in the SU QOS Null frame, then the access point will mark that client as under attack. The access point will also ignore that SU QOS Null Frame.

To mitigate the attack all queue information received in SU QOS Null frames will be ignored after determining a client is under attack. The access point can process the queue sizes received from QOS Null frames in response to Trigger BSRP frames and other encrypted frames.

This method could have false detection, so the inventors have considered what the impact if a station is falsely detected (because of incorrect delta value) to be under attack and what can the access point do to minimize it. As the client is assumed to be under attack, access point will ignore the SU QOS Null frames from the client which may contain valid queue sizes. If the station has no data, then there would be no impact in its performance. But access point may schedule UL transmit opportunities for this station resulting in wasted network capacity. The access point can be smart to detect a non-responsive client and hence discontinue scheduling UL transmissions for this station. If the station has data, it will initiate UL SU transmissions in absence of UL MU opportunities. These packets would also contain the queue sizes in QOS control fields. This information could then be used by the AP for scheduling UL MU opportunities for the STA, and hence no impact.

We will now discuss the second attack scenario, incorrect UL OFDMA capability information, in the context of the framework outlined in FIG. 2. UL-OFDMA support status goes in the HE variant of HT control field, and is optional. This makes detection of this attack difficult, as the client may not advertise the current UL-OFDMA support status frequently. This also may make it easier for the attacker to override the actual value advertised by the station.

The possible scenarios in this attack are show in table 400 of FIG. 4. In table 400, it is shown that when the station has data to transmit on the UL, the station supports UL-OFDMA, and the attacker advertises that the station does not support UL-OFDMA, then the impact is that the station will miss opportunities for UL-OFDMA when it was scheduled by the access point. Likewise, if the station has data to transmit on the UL, the station does not support UL-OFDMA, and the attacker advertises that the station does support UL-OFDMA, then a DOS will result for other clients in the BSS as assigned Resource Units (RUs) are wasted and overall BSS throughput is reduced.

Continuing with table 400, if there is no UL data at the station, the station supports UL-OFDMA, and the attacker advertises that the station does not support UL-OFDMA, then there is no impact. However, if there is no UL data at the station, the station does not support UL-OFDMA, and the attacker advertises that the station does support UL-OFDMA, then a DOS will result for other clients in the BSS as assigned RUs are wasted and overall BSS throughput is reduced.

Returning to addressing the second attack, to account for these complexities, stations are tagged as prompt and non-prompt. While monitoring client traffic, the clients are tagged based on:

Prompt: the frequency at which the client/station makes the UL-OFDMA information available to the access point is high. The station keeps sending the HT control field in most frames or sends frequent QOS Null frames with this data.

Non-Prompt: If the client sends the HT control field only when needed to inform of a change.

To detect this attack, and decide to whether to test if a station is suspicious, for prompt stations, if received frames have conflicting UL-OFDMA information where only QOS Null frames are inconsistent then the access point may mark that client as suspicious. For non-prompt stations, the information is received infrequently, and thus does a very limited amount of harm to the operation of the network, it is ok to skip straight to testing whether the client is under attack.

To test, the access point can schedule an UL-OFDMA TXOP for the station whenever there is a change in the UL-OFDMA operational parameters of the station. If the attacker has disabled UL-OFDMA and the station responds, then that indicates that station actually supports UL-OFDMA and confirms that the station is under attack. If the attacker has enabled UL-OFDMA and the station does not respond for multiple consecutive attempts, then the station does not actually support UL-OFDMA and confirms that the station is under attack.

To mitigate this attack the access point may ignore all UL-OFDMA capability information received in QOS Null frames. The access point may process the information received from QOS Null frames that are in response to trigger frames and other encrypted frames.

As in the first attack described above, false positives are possible, and the impact of a false positive should be considered. Consider a station that has disabled UL-OFDMA support and the access point has ignored this information in QOS NULL: the access point will continue scheduling the station for UL-OFDMA. This could be UL MU data or control data. After in failures by the station to send UL MU data, the station will be considered incapable of UL MU data transmission using OFDMA. After n failures by the station to send UL MU control information (e.g. responses to MU-BAR etc.), the station will be considered incapable of UL MU Data transmission using OFDMA. Thus, the impact of this type of false positive is very minor.

Consider a station that has enabled UL-OFDMA and the access point has ignored this information: the access point will not schedule the station for UL-OFDMA and hence stations will suffer if falsely detected. For such stations marked under attack, the access point needs to periodically query the validity of UL-OFDMA support. The period (1) of the query could be a function of the number of HE stations in the network, type of station, UL traffic profiling, etc. To validate support for "UL MU Disable" bit, the access point will send a Trigger BSRP frame soliciting a response from the peer under attack. A response in the given RU validates "UL MU Disable" bit is 0 and trigger-based MU transmissions are enabled. To check if trigger-based UL MU Data frame transmissions are enabled, the access point monitors the stations which have data for transmission. If a QOS NULL frame received in response to the previously mentioned Trigger BSRP indicates queued UL data, the access point will schedule a Trigger Basic frame. Reception of data in response to the Trigger Basic Frame shall confirm support for UL-OFDMA data support. The client is thus able to recover within a time T and resume MU transmissions. If the station does not have data for UL transmission, it gets next opportunity for MU transmission after period T.

Figure 3:
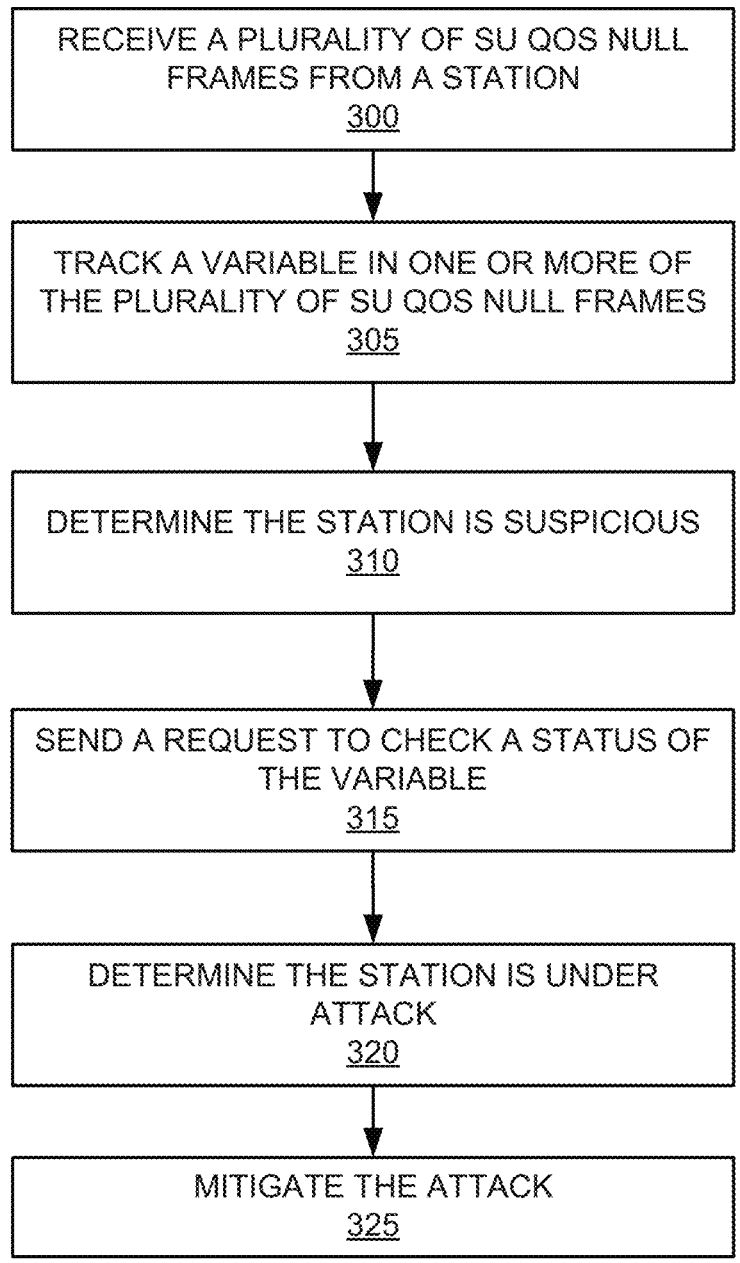
FIG. 3 depicts a flowchart of a method for protecting networks from QOS Null attacks in accordance with one or more embodiments.

FIG. 3 depicts a flowchart of a method for protecting networks from QOS Null attacks in accordance with one or more embodiments. Although the steps in FIG. 3 are shown in an order, it is not the only order for the steps. The steps may be performed at any time, in any order. Additionally, the steps may be repeated or omitted as needed.

Additionally, the steps may be performed by any suitable device, such as an access point, controller, switch, computing device, network infrastructure device, etc. The suitable device may include a hardware processor (not shown), such as one or more central processing units (CPUs), semiconductor-based microprocessors, and/or other hardware devices suitable for retrieval and execution of instructions stored in a machine-readable storage medium (not shown). The hardware processor may fetch, decode, and execute instructions, to control processes or operations for protecting networks from QOS Null attacks in accordance with one or more embodiments. As an alternative or in addition to retrieving and executing instructions, hardware processor may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium, may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some embodiments, a machine-readable storage medium may be a non-transitory storage medium, where the term "non-transitory" does not encompass transitory propagating signals.

In step 300, a plurality of SU QOS Null Frames are received from a station. The frames may be received at any time, in any manner, and may contain any information as described herein. An access point may receive SU QOS Null Frames from many different stations in a given timeframe, and the frames may be identified in any manner.

In step 305, a variable in one or more of the plurality of SU QOS Null Frames is tracked. The variable tracked may vary depending on the type of attacks suspected or anticipated. The amount or type of tracking may change dynamically. Any number of variables may be tracked. The variable may be a simple count of the SU QOS Null frames received, may be specific to a field within the SU QOS Null frame, may be time based, and/or any other information that may be tracked. The tracking may be performed in any manner now known or later developed.

In step 310, a determination is made that the station is suspicious. The determination may be made based on information received in SU QOS Null frames, or from any other source. The determination may be updated or revised over time as more information becomes available, or for any other reason. Once the determination is made, the station may be marked as suspicious in any suitable manner.

In step 315, a request is sent to check a status of or related to the variable. The request is to assist in validating the determination that the station is suspicious. Generally, the request will involve a secure, or otherwise valid, way to check the actual status of a variable that was tracked and part of the determination that the station is suspicious. However, the request or test is not limited to that, and may be anything described herein, anything within a broad related scope to the tests described herein, or anything later developed.

In step 320, a determination is made that the station is under attack. The determination is based on the response, or lack of a response, to the request/test of step 315. The determination may be made over time, i.e., based on multiple requests, or may be based on a single request/response. The determination may be made in any manner now known or later developed.

In step 325, the attack is mitigated. The mitigation may involve flagging or otherwise marking the station as under attack, ignoring certain data from the station, and/or any other suitable action or actions. The mitigation strategy may change or adjust dynamically, such as in response to the attack changing, or for any other reason.

Figure 5:
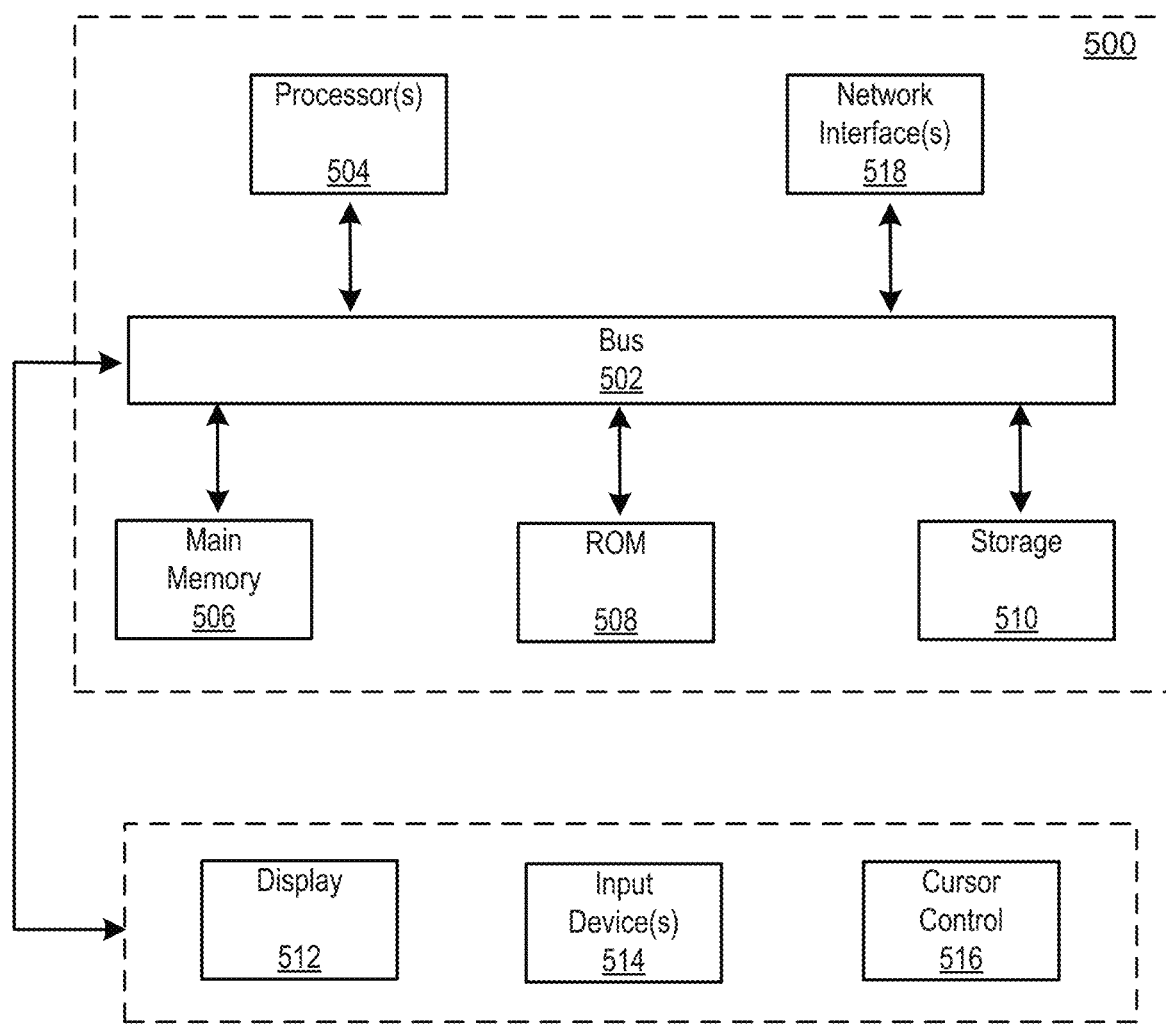
FIG. 5 depicts a block diagram of an example computer system in which various of the embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518. The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
receiving, by an access point, a plurality of Single User (SU) Quality of Service (QOS) NULL frames from a station;
tracking, by the access point as the plurality of SU QOS NULL frames are received, a variable across the plurality of SU QOS NULL frames;
determining, by the access point and based on tracking the variable, the station is suspicious;
sending to the station, by the access point and in response to determining the station is suspicious, a request to check a status of the variable;
determining, by the access point and based on a response to the request, the station is under attack; and
flagging, by the access point, the station as under an attack.

2. The method of claim 1, wherein the variable is a queue size, and wherein tracking the variable comprises determining a delta between the variable of recent SU QOS NULL frames.

3. The method of claim 2, wherein the request to check the status of the variable further comprises:
sending a Trigger Buffer Status Report Poll (BSRP) frame to the station; and
receiving, in response to the Trigger BSRP, a response from the station comprising a current queue size.

4. The method of claim 3, wherein determining the station is under attack further comprises:
comparing the current queue size to a queue size received in a SU QOS NULL frame.

5. The method of claim 2, further comprising:
mitigating the attack by ignoring the queue size from any SU QOS NULL frames.

6. The method of claim 1, wherein the variable is a support for Uplink (UL) Orthogonal Frequency-Divisional Multiple Access (OFDMA), and wherein tracking the variable comprises determining a frequency of providing the variable to the access point.

7. The method of claim 6, wherein the request to check the status of the variable further comprises:
scheduling an UL-OFDMA transmit opportunity for the station.

8. The method of claim 7, wherein determining the station is under attack further comprises:
receiving a response to the UL-OFDMA transmit opportunity when UL-OFDMA is disabled or receiving no response to the UL-OFDMA transmit opportunity when UL-OFDMA is enabled.

9. The method of claim 6, further comprising:
mitigating the attack by ignoring the support for UL-OFDMA from any SU QOS NULL frames.

10. An access point, comprising:
a processor;
a memory, storing instructions which, when executed by the processor, cause the processor to:
receive a plurality of Single User (SU) Quality of Service (QOS) NULL frames from a station;
track, as the plurality of SU QOS NULL frames are received, a variable across the plurality of SU QOS NULL frames;
determine, based on tracking the variable, the station is suspicious;
send to the station, in response to determining the station is suspicious, a request to check a status of the variable;
determine, based on a response to the request, the station is under attack; and
flag the station as under an attack.

11. The access point of claim 10, wherein the variable is a queue size, and wherein tracking the variable comprises determining a delta between the variable of recent SU QOS NULL frames.

12. The access point of claim 11, wherein the request to check the status of the variable further comprises instructions to:
send a Trigger Buffer Status Report Poll (BSRP) frame to the station; and
receive, in response to the Trigger BSRP, a response from the station comprising a current queue size.

13. The access point of claim 12, wherein determining the station is under attack further comprises instructions to:
compare the current queue size to a queue size received in a SU QOS NULL frame.

14. The access point of claim 11, further comprising instructions to:
mitigate the attack by ignoring the queue size from any SU QOS NULL frames.

15. The access point of claim 10, wherein the variable is a support for Uplink (UL) Orthogonal Frequency-Divisional Multiple Access (OFDMA), and wherein tracking the variable comprises determining a frequency of providing the variable to the access point.

16. The access point of claim 15, wherein the request to check the status of the variable further comprises instructions to:
schedule an UL-OFDMA transmit opportunity for the station.

17. The access point of claim 16, wherein determining the station is under attack further comprises instructions to:
receive a response to the UL-OFDMA transmit opportunity when UL-OFDMA is disabled or receive no response to the UL-OFDMA transmit opportunity when UL-OFDMA is enabled.

18. The access point of claim 15, further comprising instructions to:
mitigate the attack by ignoring the support for UL-OFDMA from any SU QOS NULL frames.

19. A non-transitory computer readable medium comprising instructions which, when executed by at least one processor of an access point, causes the at least one processor to:
receive a plurality of Single User (SU) Quality of Service (QOS) NULL frames from a station;
track, as the plurality of SU QOS NULL frames are received a variable across the plurality of SU QOS NULL frames;

determine, based on tracking the variable, the station is suspicious;
send to the station, in response to determining the station is suspicious, a request to check a status of the variable;
determine, based on a response to the request, the station is under attack; and
flag the station as under an attack.

20. The non-transitory computer readable medium of claim 19, wherein the variable is a queue size, and wherein tracking the variable comprises determining a delta between the variable of recent SU QOS NULL frames.

* * * * *